Sept. 24, 1935. D. E. JENKINS ET AL 2,015,452
MECHANISM FOR REMOVING BURRS FROM TUBES, ETC
Filed July 15, 1933 2 Sheets-Sheet 1
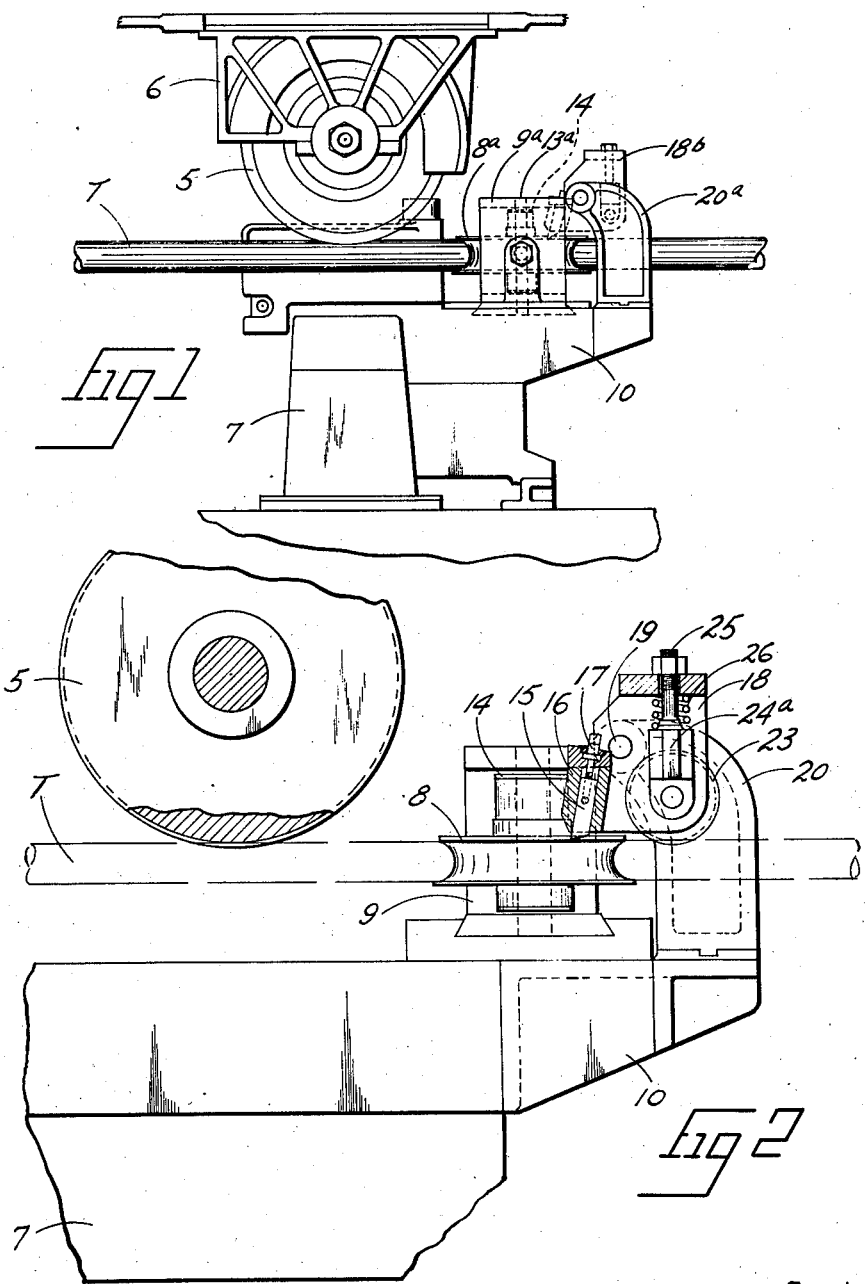
Inventors
DAVID E. JENKINS &
FRANK J. SCHAEFFER
By
Richey & Watts
Attorney

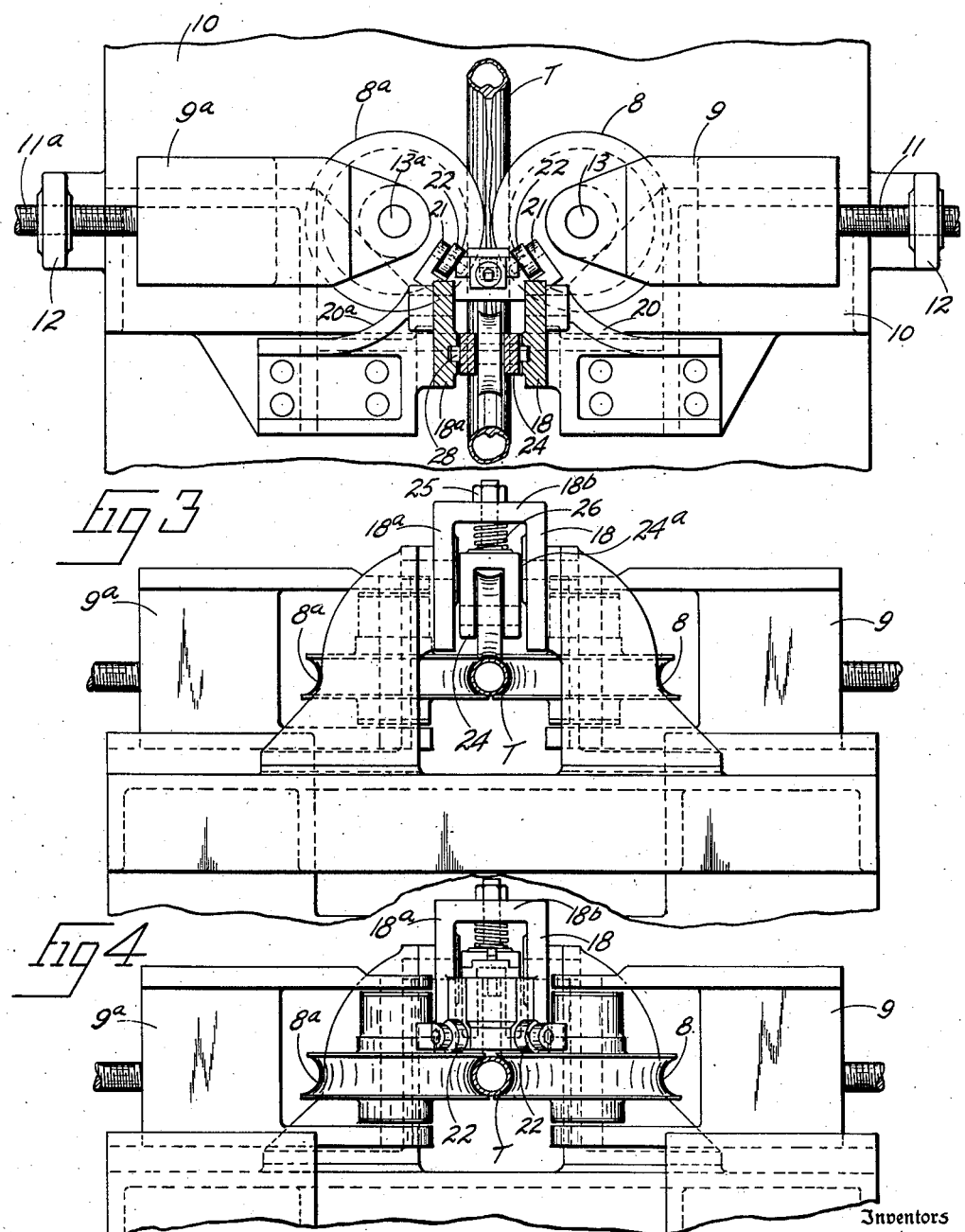

Patented Sept. 24, 1935

2,015,452

UNITED STATES PATENT OFFICE 2,015,452

MECHANISM FOR REMOVING BURRS FROM TUBES, ETC.

David E. Jenkins and Frank J. Schaeffer, Youngstown, Ohio, assignors to Republic Steel Corporation, Youngstown, Ohio, a corporation of New Jersey Application July 15, 1933, Serial No. 680,546

11 Claims. (Cl. 90—24)

This invention relates broadly to the manufacture of welded steel tubing and/or pipe and is particularly concerned with mechanism for removing the exterior burr which is formed lengthwise of the pipe at the seam as a result of the welding operation.

Prior practice in removing or trimming the exterior burr from a welded pipe was subject to certain disadvantages from an operative standpoint. In the first place the cutting tool was carried on the frame of the welder in a relatively fixed position or plane with respect to the traveling tube or pipe and hence the plane of cut remained fixed regardless of any variation, however slight, in the line of travel of said tube or pipe. This naturally resulted in variations in wall thickness at the welded seam. Also, the successive ends of the pieces of pipe often engaged the tool at different planes, resulting in chipping of the cutting edge of the latter and damage to the tool as well as the pipe. The foregoing and other disadvantages have been accepted as unavoidable in the burr-removing operation.

An object of the present invention is to provide a burr-trimming device for welded steel pipe which will maintain a uniform depth of cut.

Another object is to provide a burr-trimming tool whose cutting position is governed by the plane of travel of the pipe and which completely removes the burr thereby assuring a uniform wall thickness at the welded seam.

Another object is to provide a burr-trimming tool assembly wherein the tool is brought into engagement with the burr in a manner such as to avoid any possible shock to the tool and breakage of the latter.

The foregoing and other objects and advantages will become apparent when taken in conjunction with the description and drawings, wherein:

Figure 1 is a view in side elevation of a pipe welding unit and burr-trimming mechanism embodying the features of our invention;

Figure 2 is an enlarged fragmentary elevational view of the burr-trimmer and associated elements;

Figure 3 is an enlarged plan view of the burr-removing assembly with certain of the parts thereof in section; and Figures 4 and 5 are, respectively, view in rear and front elevation of the same assembly.

As illustrated in the drawings, particularly Figures 1 and 2, the burr-removing assembly is shown in operative relation with an electric welding unit of an electric resistance welded pipe making machine, the part of the unit here shown includes the welding electrodes 5 which are carried in a suitable frame 6 and disposed to operate on a length of pipe indicated at T, and a pressure roll stand 7 including side pressure rolls, not shown, which cooperate with the electrode to constitute the welding throat of the welding unit.

The mechanism embodying the features of the present invention comprises a pair of substantially horizontally disposed rolls 8 and 8a, which are rotatably mounted in housings 9 and 9a slidably supported on the upper surface of a frame or base 10. The housings 9 and 9a are mounted for adjustment towards and away from one another through the medium of screws 11 and 11a which are threaded through brackets 12 at opposite sides of the supporting frame 10. The rolls 8 and 8a are slidably mounted on vertically disposed axles 13 and 13a, a slight space as at 14 being provided to permit the floating of these rolls on their axles.

The rolls 8 and 8a guide the pipe as well as maintain a definite relation between the trimming tool and seam of the pipe.

The trimming or cutting tool is indicated at 15 and is adjustably mounted in a tool holding block 16 through the medium of a screw adjustment 17. The block 16 is carried at the one end of and between a pair of spaced rocker arms or analogous members 18 and 18a which are joined at the top by an integral cross head 18b, the said rocker arms and cross head constituting in effect a pivoted yoke or bracket member which is fulcrumed at 19 on a pair of bracket arms 20 and 20a which extend upwardly from the base 10.

Each of the rocker arms adjacent the tool holder is provided with an angularly disposed bearing lug 21 in which are mounted tool guiding rolls 22, note particularly Figure 3. These rolls 22 bear against the upper face of the main pipe guiding rolls 8 and 8a so that the position of the tool is governed by the position of the rolls 8 and 8a acting through the auxiliary rollers 22.

The rear extremity of the rocking bracket member, comprising the arms 18, 18a and cross head 18b, carries a tilting roller 23 which is mounted for resilient vertical sliding movement through the medium of a yoke 24, said yoke being provided with side guiding portions 24a which are mounted to slide in guide grooves formed in the arms 18 and 18a. The yoke 24 is provided with a trunnion or pin 25 which is projected upwardly through and has bearing in the cross head 18b, a spring 26 being inserted over the said trunnion between the bracket 24 and cross head 18b.

The weight of the main yoke member, comprising the arms 18, 18a and cross head 18b, is distributed with respect to the fulcrum point 19, so that the said yoke normally will rock rearwardly by gravity with the tool 15 tilted upwardly clear of the plane of travel of the pipe T, so that the said tool is brought into engagement with the work through contact of the pipe with the tilting roller 23.

The operation of the improved burr-trimming assembly is substantially as follows: The pipe T, after being acted upon by the welding electrodes 5 passes between the rollers 8 and 8a and comes into contact with the tilting roller 23, whereby the yoke comprising the arms 18, 18a and cross head 18b is rocked forwardly, bringing the tool into engagement with the welded seam. This forward tilting movement also brings the auxiliary tool-guiding rolls 22 into contact with the upper surfaces of the rolls 8 and 8a. Since the rolls 8 and 8a have a limited vertical floating action, their position will vary with any variation in the plane of travel of the pipe T, so that the tool will always be maintained in a position which will produce an even depth of cut and a uniform wall thickness at the seam along the entire length of the pipe. Since the assembly automatically tilts rearwardly so that the tool will be out of cutting position when a pipe length has passed therethrough, the end of the incoming pipe will clear the tool and will not strike the latter above the cutting edge and thereby damage the tool. Furthermore, since the yoke 24 which carries the tilting roller 23 is resiliently mounted, any shocks incident to the forward tilting action will be absorbed and dissipated and thereby insure against any damage to the cutting edge of the tool due to more or less violent contact with the pipe.

It will be understood that certain structural modifications and variations may be adopted within the scope of the invention as defined by the appended claims.

We claim:

1. In a mechanism for removing the burr from the welded seam of a traveling pipe, a cutting tool and a pivotal support therefor, means engageable with the support and operative to urge the tool to a position above its cutting position, and means cooperative with the support and engageable with the pipe to hold the tool in cutting position, whereby when a length of pipe clears the burr-removing mechanism the tool moves out of cutting position to provide clearance for the end of an incoming length of pipe.

2. In a mechanism for removing the burr from the welded seam of a traveling length of pipe, a cutting tool, a rocking support for said tool organized to normally rock rearwardly and hold the tool clear of the plane of travel of the pipe, and means adapted to contact the pipe and rock the said support forwardly and move the tool into cutting position, whereby when a length of pipe clears the burr-removing mechanism the tool moves out of cutting position to provide clearance for the end of an incoming length of pipe.

3. In mechanism for removing the burr from the welded seam of a length of traveling pipe, a cutting tool, a rocking support for said tool organized to normally rock rearwardly and hold the tool clear of the plane of travel of the pipe, a roller having an operative connection with said support and adapted to contact the pipe and rock the support forwardly and move the tool into cutting position whereby when a length of pipe clears said roll the tool moves out of cutting position to provide clearance for the end of an incoming length of pipe.

4. In mechanism for removing the burr from the welded seam of a traveling length of pipe, a cutting tool, a rocking support for said tool organized to normally rock rearwardly and hold the tool clear of the plane of travel of the pipe and a resiliently mounted idler roll having an operative connection with said support and adapted to contact the pipe and rock the support forwardly and move the tool into cutting position.

5. Mechanism for removing the burr from the welded seam of a length of pipe comprising: a rocking tool support, a cutting tool carried by said support having an unbalanced pivotal mounting in order to normally hold the cutting tool clear of the line of travel of the pipe, an idler roll adapted to contact the tubing and having an operative connection with said support to rock the support forwardly and hold the tool in cutting position, a pair of oppositely disposed tool guiding rolls having a floating mounting in an axial direction to permit axial movement of said rolls in accordance with variations in the plane of travel of said pipe, and means for transmitting motion from said rolls to said support to thereby control the cutting position of the tool through the position of the pipe in a plane normal to the line of travel of the latter.

6. Mechanism for removing the burr from the welded seam of a traveling pipe comprising: a cutting tool, a rocking support for said tool, said support having an eccentric pivotal mounting in order to normally hold the tool out of cutting position, a resiliently mounted guide roller connected to said support and adapted to contact the pipe and urge the tool into cutting position, a pair of oppositely disposed tool guiding rolls mounted on and engageable with opposite sides of the pipe and capable of shifting on their axes in response to variations in the plane of travel of the pipe, and auxiliary tool guiding rolls mounted on said support, and engageable with the end surfaces of the main guide rolls when the resiliently mounted guide roll is in contact with the pipe to rock the tool support coincident with variations in the plane of travel of the pipe.

7. A burr-removing machine adapted to be used in conjunction with a tube-welding unit comprising: a base frame, a pair of horizontally-disposed idler rolls carried by said base frame between which the welded pipe is adapted to pass, said rolls bearing against and tracking the pipe and being permitted a limited floating movement in an axial direction to permit them to move axially in response to variations from the normal plane of travel of the pipe, a cutting tool, a rocking bracket or yoke member for said tool which is eccentrically fulcrumed and balanced so as to tilt by gravity rearwardly and move the tool out of cutting position after a pipe length clears the machine, an idler roll carried by said rocking member adapted to contact the pipe and move the tool into cutting position and maintain it in such position until the pipe length clears the machine, and means responsive to axial movement of said horizontally-disposed idler rolls and having an operative connection with said rocking member for guiding said tool.

8. A device for removing burr metal from longitudinally welded metal pipe comprising; a burr cutting tool, a support therefor movable about an axis disposed transversely to the line of travel of the pipe, means engaging the pipe and movable therewith in a plane at right angles to the axis of said support and engageable with the support to limit the extent of movement of the cutting tool toward the pipe, and means carried by the support and engaging with the pipe for moving the support about its axis and urging the tool toward the pipe.

9. A device for removing burr metal from a longitudinally welded pipe comprising; a burr cutting tool, a support therefore movable about an axis disposed transversely to the line of travel of the pipe, oppositely disposed rollers engaging the pipe and movable therewith in a plane at right angles to the axis of said support adapted to cooperate with the support to limit the extent of movement of the tool toward the pipe, and means carried by the support and actuated by the pipe for moving the support about its axis, said means including a roller engaging with said pipe and movable therewith.

10. A device for removing burr metal from a longitudinally welded metal pipe, comprising; a burr cutting tool, a support therefor movable about an axis disposed transversely to the line of travel of the pipe, means engaging the pipe and movable therewith in a plane at right angles to the axis of said support adapted to cooperate with the support to maintain a predetermined position of the tool with respect to the pipe when the tool is in cutting position, and means carried by the support for moving the same about its axis, said means including a part engageable with the pipe and movable thereby.

11. A device for removing the welding burr from a longitudinally welded hollow metal cylinder comprising a cutting tool, a tool holder mounted to rotate about a pivot axis, means to move a welded hollow metal cylinder axially past said pivot axis, rollers engageable with said cylinder and movable axially at right angles to said pivot axis with said cylinder, rollers on said holder and engageable with said cylinder engaging rollers to limit the movement of the tool toward the cylinder, and means on the holder and engageable with the cylinder to urge the tool toward the cylinder and to press the rollers on the holder against the cylinder engaging rollers.

DAVID E. JENKINS.
FRANK J. SCHAEFFER.